United States Patent [19]

Fujita et al.

[11] Patent Number: 4,804,417
[45] Date of Patent: Feb. 14, 1989

[54] PROCESS FOR PRODUCING DIOXAZINE VIOLET PIGMENT

[75] Inventors: Taira Fujita; Yoshiaki Hayashi; Hiroshi Okayasu, all of Osaka, Japan

[73] Assignee: Sumitomo Chemical Company, Limited, Osaka, Japan

[21] Appl. No.: 127,768

[22] Filed: Dec. 1, 1987

[30] Foreign Application Priority Data

Dec. 11, 1986 [JP] Japan ................................ 61-296038

[51] Int. Cl.$^4$ .............................................. C08K 5/34
[52] U.S. Cl. ..................................... 106/498; 106/471
[58] Field of Search ........................... 106/309, 288 Q

[56] References Cited

U.S. PATENT DOCUMENTS 4,253,839  3/1981  Spietschka et al. ...................... 8/565
4,317,908  3/1982  Sakaguchi et al. ..................... 544/74
4,481,358  11/1984  Sakaguchi et al. ..................... 544/99

OTHER PUBLICATIONS

Derwent Abstract 83-744618/34, Japanese Patent No. 3748, Jul. 18, 1983.
Chemical Abstract, vol. 62, Abstract 2915h (1965).

*Primary Examiner*—Amelia Burgess Yarbrough
*Attorney, Agent, or Firm*—Cushman, Darby & Cushman

[57] ABSTRACT

Dioxazine violet pigment clear in color hue, high in tinting strength and good in dispersibility, which is suitable for ink, is prepared by treating a crude dioxazine violet with sulfuric acid (to finer it) and then treating an aqueous suspension of the resulting dioxazine violet in coexistence of an alcohol and an inorganic salt.

9 Claims, No Drawings

PROCESS FOR PRODUCING DIOXAZINE VIOLET PIGMENT

This invention relates to a process for production of a dioxazine violet pigment having clear hue, high tinting strength and good dispersibility and used for coloration of paints, resins, printing inks, textile inks, etc.

As to the pigmentation of crude dioxazine violet (Color Index, Pigment Violet 23), there have heretofore been known a wet or dry pulverization method wherein the crude dioxazine violet is treated by means of kneader or ball mill using a large amount of inorganic salts or balls, respectively; crude dioxazine pigments are subjected to dry milling while maintaining their crystallinity as far as possible until the desired degree of fineness is reached and then treated with a solvent (U.S. Pat. No. 4,253,839), and so on. In these known methods, however, various problems remain unsolved. For example, according to the pulverization method, a large amount of inorganic salts or balls must be used, and therefore the amount per batch of the fed crude material is inevitably decreased, so that the productivity is lowered, and moreover it is necessary to recover the used inorganic salts after the pigmentation. The pulverization method have limitation in size of particles to be obtained, so it hardly provides primary particles of very fine size. In order to improve fineness of particles obtained, an acid slurry method, i.e., a method for obtaining fine particles by conditioning by sulfuric acid treatment is proposed (Japanese Published Examined Patent Publication No. 16786/1964). Fine particles obtained by only conditioning sulfuric acid treatment are not suitable for pigments as they are, since they are generally highly aggregated. In order to develop or impart suitability as pigment, there have been known methods which include treatments with organic solvents, for example, the method which comprises treating the particles obtained by sulfuric acid with aromatic compounds having a low solubility in water (U.S. Pat. No. 4,317,908), the method of treating them with aliphatic or alicyclic ketones or esters (U.S. Pat. No. 4,481,358), the method of treating them with aliphatic or alicyclic alcohols (Japanese Published Unexamined Patent Application No. 120673/1983), etc. However, in these methods, heat treatment is usually effected in order to improve performances of pigment. This treatment induces growth of particles, although dispersibility and uniformity are improved, by which some of favorable properties of particles obtained with a treatment with sulfuric acid are lost. In other words, tinting strength and clarity in hue are not satisfactory in spite of conditioning by sulfuric acid treatment.

After inventors' intensive researches, it is found that a treatment of dioxazine violet of fine size obtained by applying sulfuric acid with an alcohol and an inorganic salt in the aqueous suspension provides dioxazine violet pigment having high tinting strength and clear hue as well as smaller particle size than that of the conventional products obtained by treatment with organic solvents, because of causing no growth of particles.

According to the present invention, a process is provided for producing a dioxazine violet pigment which comprises treating crude dioxazine violet with sulfuric acid until it is completely converted to the sulfate and then hydrolyzing the sulfate to finer particles thereof and then treating an aqueous suspension of the resulting particels with both of an alcohol and an inorganic salt.

This invention will be explained in detail below.

Conditioning of crude dioxazine violet is carried out in a known manner with sulfuric acid. That is, crude dioxazine violet of coarse particles is added to sulfuric acid of about 60-90% in concentration, followed by further heating with stirring or stirring with keeping the temperature in si-tu to convert to sulfate. Then, this sulfate is discharged into a large amount of water to effect hydrolysis. The resulting hydrolyzate is collected by filtration and washed with water to obtain a wet cake. If necessary, this wet cake is further put in water, adjusted to neutral in pH with addition of an alkaline agent, collected by filtration and washed with water.

The aqueous suspension in this invention is obtained by suspending this wet cake in water. An amount of water in the aqueous suspension is critical and is usually 2-40 times, preferably 5-20 times as much as the weight of pigment.

The next step is a treatment of the aqueous suspension with an alcohol and an inorganic salt. The term "treatment" means to have the dioxazine violet pigment of finer particles brough into contact thoroughly with alcohol and inorganic salts, such as with stirring. If necessary, this treatment may be done under heating.

The alcohol and the inorganic salt are usually added to the aqueous suspension of pigment mentioned above. However, so far as inorganic salt is concerned, a part of inorganic salt produced in si-tu during the neutralizing step subsequent to the hydrolysis above may be left, in place of the addition.

An amount of alcohol to be added is usually 0.1-5.0 times, preferably 0.5-2.0 times by weight as much as pigment in terms of a solid matter.

Alcohols suitable in this invention are those of 3-12 carbon atoms, such as n-propyl alcohol, isopropyl alcohol, n-butyl alcohol, isobutyl alcohol, tert-butyl alcohol, n-amyl alcohol, isoamyl alcohol, n-hexyl alcohol, cyclohexyl alcohol, heptanol-3, n-octyl alcohol and 2-ethylhexyl alcohol.

An amount of the inorganic salt to be present in the aqueous suspension is 0.1-25%, preferably 1-20% by weight of water. The amount of this inorganic salt is also an important factor for effective practice of this invention.

The inorganic salts are, for example, sodium chloride, sodium sulfate, sodium nitrate, calcium chloride, calcium nitrate, potassium chloride, potassium nitrate, potassium sulfate, lithium chloride, lithium nitrate, lithium sulfate, magnesium chloride, magnesium nitrate and magnesium sulfate. Preferred are sodium chloride, sodium sulfate, potassium chloride, potassium sulfate, lithium chloride and magnesium chloride.

The treatment is usually carried out at a temperature of 0°-120° C., preferably 10°-90° C., for 0.1-20 hours, preferably 1-10 hours.

It is preferred to remove the alcohol after the treatments, by, for example, azeotropic distillation or steam distillation after filtration and washing.

Dioxazine violet pigment thus obtained is recovered as a wet cake by filtration and washing irrespective of the method employed for removal of alcohol solvent referred to hereabove. A dry cake is obtained by drying the wet cake.

The pigment obtained by this invention is in the form of particles of very small diameter having a specific surface area of more than 25 $m^2/g$ greater than that of the conventional organic solvent-treated products. The performance of the pigment is excellent without losing the favorite charateristics of particles treated with sulfuric acid. That is, this pigment as colorant for paints, resins, printing inks, textile inks, etc. is superior to the conventional organic solvent-treated product in respect to hue, tinting strength and dispersibility. Especially as colorant for textile ink, the wet cake product of this invention is satisfactory, since they have a solid content of as high as 40–55% according to filtration by Nutsche funnel. The higher solid content in the cake is, the more convenient is from the point of transportation and handling at charging.

This invention will be explained in more detail in the following examples and reference examples wherein part and % are by weight and the specific surface area is measured by BET method according to gas adsorption.

REFERENCE EXAMPLE 1

(Preparation of conditioned cake)

Two hundred parts of crude dioxazine violet (Elemental analysis value: C; 69.0%, H; 3.4%, N; 9.2%, Cl; 11.8%) was added to 2,000 parts of 78% sulfuric acid and this was stirred at 50° C. for 5 hours, then discharged into 30,000 parts of water, filtered and washed with water. The thus obtained wet cake was added to 3,000 parts of water and dispersed with stirring. The dispersion was adjusted to pH 7.0 by adding dropwise 5% caustic alkali solution and then filtered and washed with water to obtain 933.3 parts of a wet cake of 21.0% in solid content.

REFERENCE EXAMPLE 2

(Preparation of conditioned cake)

Two hundred parts of crude dioxazine violet (same as used in Reference Example 1) was added to 1,800 parts of 71% sulfuric acid and this was stirred at 25° C. for 10 hours, then discharged into 3,000 parts of water and thereafter subjected to the same procedures as in Reference Example 1 to obtain 956.1 parts of a wet cake of 20.5% in solid content.

REFERENCE EXAMPLE 3

(Preparation of conditioned cake)

Two hundred parts of crude dioxazine violet (the same product as in Reference Example 1) was added to 2,500 parts of 82% sulfuric acid, followed by stirring at 25° C. for 4 hours. Thereto was added dropwise a necessary amount of 20% caustic alkali solution (since heat was generated due to neutralization heat during the addition, the addition was carried out under cooling to keep the temperature at 25° C.) to adjust the pH to 7.0, followed by filtration and washing with water to obtain 980.0 parts of a wet cake of 20.0% in solid content.

EXAMPLE 1

The wet cake (47.6 parts, solid content 21.0%) obtained in Reference Example 1 was suspended in 112.4 parts of water and thereto was added 20 parts of sodium sulfate. Thereafter, thereto was added 10 parts of isobutyl alcohol, followed by stirring at 50° C. for 5 hours. Then, the suspension was heated to remove isobutyl alcohol by azeotropic distillation and then filtered and washed with water to obtain 20.5 parts of a wet cake of 47.8% in solid content.

This cake was dried to obtain 9.8 parts of dried product which had a specific surface area of 164.0 m²/g.

EXAMPLES 2–9

The wet cake (47.6 parts, solid content 21.0%) each obtained in Reference Example 1 was treated under various conditions and the results are shown in Table 1. Removal of alcohol and recovery of pigment were performed in the same manner as in Example 1.

EXAMPLES 10–17

The wet cake (48.8 parts, solid content 20.5%) each obtained in Reference Example 2 was treated under various conditions and the results are shown in Table 2. Removal of alcohol and recovery of pigment were performed in the same manner as in Example 1.

TABLE 1

|  | Amount of water (part) | Alcohol Kind | Part | Inorganic salt Kind | Part | Treating temp. (°C.) | Treating time (H) | Solid content (%) | Amount of product (part) | Specific surface area (m²/g) |
|---|---|---|---|---|---|---|---|---|---|---|
| Example 2 | 82.4 | Isobutyl alcohol | 15 | Sodium sulfate | 20 | 25 | 5 | 49.0 | 9.8 | 160.5 |
| Example 3 | 42.4 | Isobutyl alcohol | 0.5 | Sodium chloride | 20 | 80 | 1 | 45.5 | 9.8 | 155.0 |
| Example 4 | 162.4 | n-Butyl alcohol | 10 | Sodium sulfate | 54 | 25 | 3 | 50.0 | 9.8 | 156.0 |
| Example 5 | 112.4 | Isobutyl alcohol | 30 | Sodium sulfate | 7 | 50 | 7 | 45.0 | 9.8 | 150.2 |
| Example 6 | 112.4 | Isoamyl alcohol | 10 | Magnesium chloride | 15 | 25 | 5 | 47.3 | 9.8 | 160.0 |
| Example 7 | 62.4 | Isopropyl alcohol | 20 | Potassium chloride | 15 | 70 | 5 | 46.7 | 9.8 | 153.4 |
| Example 8 | 112.4 | n-Amyl alcohol | 10 | Sodium sulfate | 10 | 25 | 7 | 46.4 | 9.8 | 156.6 |
| Example 9 | 112.4 | Isobutyl alcohol | 15 | Potassium sulfate | 15 | 50 | 5 | 47.1 | 9.8 | 159.5 |

TABLE 2

|  | Amount of water (Part) | Alcohol Kind | Part | Inorganic salt Kind | Part | Treating temp. (°C.) | Treating time (H) | Solid content (%) | Amount of product (Part) | Specific surface area (m²/g) |
|---|---|---|---|---|---|---|---|---|---|---|
| Example 10 | 61.2 | Isobutyl | 15 | Sodium | 15 | 30 | 5 | 48.5 | 9.8 | 165.0 |

TABLE 2-continued

| | Amount of water (Part) | Alcohol Kind | Part | Inorganic salt Kind | Part | Treating temp. (°C.) | Treating time (H) | Solid content (%) | Amount of product (Part) | Specific surface area (m²/g) |
|---|---|---|---|---|---|---|---|---|---|---|
| | | alcohol | | sulfate | | | | | | |
| Example 11 | 111.2 | Isobutyl alcohol | 30 | Potassium sulfate | 8 | 25 | 5 | 45.3 | 9.8 | 151.4 |
| Example 12 | 61.2 | n-Butyl alcohol | 15 | Sodium chloride | 15 | 15 | 5 | 49.0 | 9.8 | 166.0 |
| Example 13 | 161.2 | Cyclohexyl alcohol | 10 | Sodium sulfate | 10 | 80 | 3 | 51.0 | 9.8 | 154.2 |
| Example 14 | 111.2 | Isoamyl alcohol | 10 | Sodium chloride | 20 | 50 | 5 | 50.3 | 9.8 | 156.3 |
| Example 15 | 81.2 | Isobutyl alcohol | 15 | Lithium chloride | 10 | 50 | 5 | 46.6 | 9.8 | 157.4 |
| Example 16 | 41.2 | Isobutyl alcohol | 5 | Sodium sulfate | 34 | 50 | 10 | 49.0 | 9.8 | 151.1 |
| Example 17 | 111.2 | t-Butyl alcohol | 20 | Sodium sulfate | 20 | 40 | 3 | 47.2 | 9.8 | 160.3 |

EXAMPLE 18

The wet cake (50.0 parts, solid content 20.0%) obtained in Reference Example 3 was suspended in 110 parts of water and thereto was added 20 parts of sodium sulfate. Thereafter, thereto was added 15 parts of isobutyl alcohol, followed by stirring at 60° C. for 5 hours. Then, this was subjected to the same treatments as in Example 1 to obtain 20.0 parts of a wet cake of 49% in solid content. This was dried to obtain 9.8 parts of a dry cake which had a specific surface area of 155.6 m²/g.

EXAMPLE 19

The wet cake (50.0 parts, solid content 20.0%) obtained in Reference Example 3 was suspended in 110 parts of water and thereto was added 15 parts of isobutyl alcohol. Then, 20 parts of sodium sulfate was added thereto, followed by stirring at 50° C. for 5 hours and then subjecting to the same treatments as in Example 1 to obtain 20.2 parts of a wet cake of 48.6% in solid content. This was dried to obtain 9.8 parts of a dry cake which had a specific surface area of 158.5 m²/g.

EXAMPLE 20

The wet cake (50.0 parts, solid content 20.0%) obtained in Reference Example 3 was suspended in 110 parts of water and thereto was added 10 parts of sodium sulfate. Then, thereto was further added 20 parts of isobutyl alcohol, followed by stirring at 25° C. for 5 hours and then subjecting to filtration, washing with water and then steam distillation to obtain 21.5 parts of a wet cake having a solid content of 45.5%. This was dried to obtain 9.8 parts of a dry cake having a specific surface area of 156.4 m²/g.

COMPARATIVE EXAMPLE 1

Example 1 was repeated without using sodium sulfate to obtain 35.0 parts of a wet cake having a solid content of 28.0%. This was dried to obtain 9.8 parts of a dry cake which had a specific surface area of 120.0 m²/g.

COMPARATIVE EXAMPLE 2

Example 10 was repeated except that 10 parts of toluene was used in place of isobutyl alcohol (in the presence of 20 parts of sodium sulfate) to obtain 15.1 parts of a wet cake having a solid content of 65%. This was dried to obtain 9.8 parts of a dry cake which had a specific surface area of 60.0 m²/g.

COMPARATIVE EXAMPLE 3

Example 18 was repeated except that sodium sulfate was not used and that 10 parts of methyl isobutyl ketone was used in place of isobutyl alcohol to obtain 17.8 parts of a wet cake having a solid content of 55%. This was dried to obtain 9.8 parts of a dry cake which had a specific surface area of 102.0 m²/g.

The products of this invention were evaluated and the results are shown below.

Evaluation on textile printing with the pigments:

Each of the pigments of Examples 1, 10 and 18 and Comparative Examples 1, 2 and 3 was mixed with nonionic surfactant, water and additives and was dispersed by the ordinary method to prepare concentrated colors of 10% in pigment content.

Then, each of the concentrated colors was mixed with a reducer comprising a binder (emulsion polymer of acrylate ester) and O/W emulsion to prepare a water colorant of 0.5% in pigment content. This color was printed on a fabric and color clarity was visually evaluated.

Determination of color clarity was effected on the basis of gray scale for discoloration (JIS-L-0804). The results are shown in Table 3.

TABLE 3

| | Concentration | Clarity | Specific surface area of product |
|---|---|---|---|
| Example 1 | 110–115% | 2–3 C | 164.0 m²/g |
| Example 10 | 110–115% | 2–3 C | 165.0 m²/g |
| Example 18 | 110% | 2–3 C | 155.6 m²/g |
| Comparative Example 1 | st | st | 120 m²/g |
| Comparative Example 2 | 60% | 3–4 D | 60.0 m²/g |
| Comparative Example 3 | 85% | 3 D | 102.0 m²/g |

"st" means "standard".
"C" means "clear".
"D" means "dirty".

Evaluation as a paint:

The pigments obtained in Example 1 and Comparative Example 1 were made into enamel paints with melamine alkyd paint and they were adjusted to a viscosity suitable for spray coating with a solvent. They were coated on a tinplate and baked. Color clarity of the coat including gloss was evaluated.

Determination was effected on the basis of gray scale for discoloration. The results are shown in Table 4.

TABLE 4

| | Concentration | Clarity | Specific surface area of product |
|---|---|---|---|
| Example 1 | 110–115% | 2–3 C | 164.0 m²/g |
| Comparative Example 1 | st (100%) | st | 120.0 m²/g |

We claim:

1. A process for producing dioxazine violet pigment which comprises treating a crude dioxazine violet with sulfuric acid until it is completely converted to the sulfate and then hydrolyzing the sulfate to finer particles thereof and then treating an aqueous suspension of the resulting particles with both an alcohol and an inorganic salt.

2. A process according to claim 1 wherein an amount of water in the aqueous suspension is 2–40 times as much as the weight of the pigment.

3. A process according to claim 2 wherein an amount of water is 5–20 times as much as the weight of the pigment.

4. A process according to claim 1 wherein an amount of the inorganic salt in the aqueous suspension is 0.1–25% by weight of water used.

5. A process according to claim 4 wherein an amount of the inorganic salt is 1–20% by weight of water.

6. A process according to claim 1 wherein an amount of alcohol is 0.1–5.0 times as much as the weight of pigment in terms of solid.

7. A process according to claim 6 wherein an amount of alcohol is 0.5–2.0 times as much as the weight of pigment in terms of solid.

8. A process according to claim 1 wherein a treatment of an aqueous suspension in the presence of both alcohol and inorganic salt is effected at 0°–120° C. for 0.1–20 hours.

9. A process according to claim 8 wherein the treatment is effected at 10°–90° C. for 1–10 hours.

* * * * *